United States Patent [19]

Rollett

[11] Patent Number: 4,799,646
[45] Date of Patent: Jan. 24, 1989

[54] VALVE FOR A GAS CYLINDER OR THE LIKE

[75] Inventor: Marius Rollett, Ceyzeriat, France

[73] Assignee: Society said: ROVIP, Ceyzeriat, France

[21] Appl. No.: 55,707

[22] Filed: May 29, 1987

[30] Foreign Application Priority Data

Jun. 4, 1986 [FR] France .................... 86 08038

[51] Int. Cl.⁴ .................... B16K 25/00; B16K 31/50
[52] U.S. Cl. .................... 251/88; 251/264; 251/324; 403/165
[58] Field of Search .................... 251/84, 86, 88, 215, 251/218, 219, 264, 274, 324; 403/78, 164, 165

[56] References Cited

U.S. PATENT DOCUMENTS

| | | |
|---|---|---|
| 852,802 | 5/1907 | Sears .................... 251/320 |
| 1,888,158 | 11/1932 | Browne .................... 251/86 |
| 2,563,992 | 8/1951 | DeGrave .................... 251/88 |
| 3,084,902 | 4/1963 | Hare .................... 251/88 |
| 3,278,156 | 10/1966 | Callahan, Jr. et al. .................... 251/84 |
| 3,761,052 | 9/1973 | Tobbe et al. .................... 251/88 |
| 3,904,169 | 9/1975 | Cohn et al. .................... 251/86 |

FOREIGN PATENT DOCUMENTS

| | | | |
|---|---|---|---|
| 557268 | 11/1957 | Belgium .................... 251/88 |
| 2405372 | 8/1974 | Fed. Rep. of Germany .................... 251/88 |
| 4916 | 1/1903 | United Kingdom .................... 251/88 |

*Primary Examiner*—George L. Walton
*Attorney, Agent, or Firm*—Albert L. Jeffers; Richard L. Robinson

[57] ABSTRACT

A valve device for a gas cylinder or the like, characterized in that it comprises an axially mobile piston (3) within a valve-body (1) coming to bear by one end against a seat (2), the piston moving axially by means of a handwheel (4) to which it is connected by an assembly (9, 10) allowing the rotation of the handwheel in relation to the piston.

1 Claim, 1 Drawing Sheet

VALVE FOR A GAS CYLINDER OR THE LIKE

The invention relates to a valve for a gas cylinder or the like.

The invention is characterised in that the valve comprises an axially mobile piston within a valve body, coming to bear by one end against a seat, the piston being moved axially by a handwheel to which it is linked by means of an assembly allowing the rotation of the handwheel in relation to the piston.

According to another feature of the invention, the piston and the handwheel are connected by an assembly comprising a circular fin and groove.

According to a further feature of the invention, the piston is axially guided by fins formed longitudinally on the piston wall.

According to a further feature of the invention, the handwheel, the body and the piston are made of plastic material with threaded metal inserts each cooperating in the rotation of the handwheel on the body.

The invention is represented as a non-restrictive example in the appended drawings, wherein.

Figure 1:
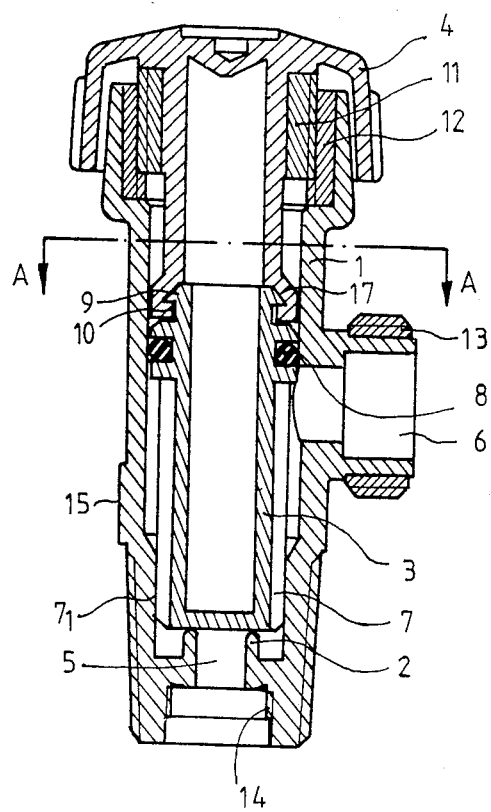
FIG. 1 is an axial section through the valve according to the invention.
Figure 2:
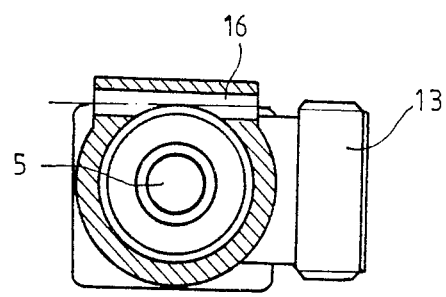
FIG. 2 is a section along A—A in FIG. 1.

The purpose of the present invention is consequently a gas-cylinder valve, and generally speaking, for all gas containers, the valve having the feature that it is entirely made of plastic material and thereby of light weight and low cost, yet being reliable.

The valve comprises a plastic material hollow body 1, equipped at its lower open end with a seat 2 against which the piston 3 also made of plastic material is intended to come to bear axially.

The piston 3 is displaced axially by means of handwheel 4 in such a manner that in the valve open position, gas can flow from the inlet aperture 5 towards the outlet aperture 6 as it passes through the periphery of the piston 3.

The piston 3 has at its periphery a number of longitudinal fins 7 which come to bear under light friction in 7₁ against the inner wall of the body 1, so as to guide the piston and so that it comes to bear at a particular point against the seat 2.

The piston 3 also has an annular groove inside which an O-ring seal 8 is located coming to bear against the inner wall of the body 1, the said groove and the seal 8 being arranged in such a manner that the seal 8 is constantly located above the gas outlet aperture 6. The upper end of the piston 3 is fitted to the handwheel 4 by means of a circular fin 9 formed at the end of the piston, the fin clipping into a groove of matching shape 10 at the lower end of the handwheel 4.

The assembly therefore allows free rotation of the piston 3 in relation to the handwheel 4, thus avoiding early wear of the piston owing to the fact that it is not driven round when it is applied against the seat 2 and when operating the handwheel to open or close the valve.

The handwheel 4 is also made of plastic material and is mounted so as to rotate on the body 1 by way of a number of threaded inserts 11 and tapped inserts 12 located respectively on the handwheel 4 and on the body 1. These inserts which are locked onto the handwheel 4 or onto the body 1, allow the rotation of the handwheel 4 for axial displacement without involving any wear incompatible with good valve reliability.

The body 1 also has a second threaded insert 13, arranged at the periphery of the discharge aperture 6, so as to allow the connection of the valve with a gas duct or the like. The valve is fitted onto the cylinder by means of a tapped hole 14 at the end of the body 1 and opening into the aperture 5 with a seat 2.

The body 1 is locked onto the thread of the gas cylinder by means of a spanner on the polygonal section area, and for instance by the square 15 on body 1.

In order to prevent the parting of handwheel and body, the body 1 has a transverse recess 16 housing a split pin (not shown here) located within the path of the lower shoulder 17 of the handwheel 4 inside which the groove 10 is located.

It will also be noted that the valve according to the invention is essentially made of plastic material and that as a result it is self-extinguishing but will also melt in fire. In case of fire, the gas cylinder transforms itself into a short-lasting torch, the valve serving as safety-valve, instead of forming with the present metal valve, a high powered delayed action bomb.

I claim:

1. Valve for gas cylinder or the like, comprising:
a valve body including a seat an inlet and an outlet;
a piston axially movable within said valve body, said piston including an end configured to bear against the seat of said valve body;
means for axially moving said piston, said moving means including a hand wheel and means for connecting the hand wheel to said piston while allowing a full and free rotation of the hand wheel relative to said piston for avoiding early wear of said piston when said piston bears against said valve seat; and
means on said piston for axially guiding said piston in said valve body while allowing gas flow therepast, said guiding means including fins extending substantialy radially from and longitudinally of said piston while extending from said valve seat to said outlet and thereby communicating the gas flow from said inlet and along said guide fins to said outlet when said piston is moved away from said valve seat.

* * * * *